United States Patent
Fujii

(10) Patent No.: US 6,790,399 B2
(45) Date of Patent: Sep. 14, 2004

(54) DISC CABLE AND METHOD FOR PRODUCING THE SAME

(75) Inventor: Kazumi Fujii, Gunma (JP)

(73) Assignee: Fujii Shokai Co., Ltd., Gunma (JP)

( * ) Notice: Subject to any disclaimer, the term of this patent is extended or adjusted under 35 U.S.C. 154(b) by 0 days.

(21) Appl. No.: 09/842,634

(22) Filed: Apr. 27, 2001

(65) Prior Publication Data

US 2002/0033270 A1 Mar. 21, 2002

(30) Foreign Application Priority Data

Sep. 21, 2000 (JP) .................................... 2000-287428
Apr. 6, 2001 (JP) .................................... 2001-108413

(51) Int. Cl.[7] ............................................ B29C 45/16
(52) U.S. Cl. ........................ 264/254; 264/255; 264/259
(58) Field of Search ............................ 264/245, 246, 264/247, 250, 254, 255, 259, 165, 167; 174/111

(56) References Cited

U.S. PATENT DOCUMENTS

| | | | | |
|---|---|---|---|---|
| 1,430,042 A | * | 9/1922 | Raczynski | 174/101.5 |
| 2,288,899 A | * | 7/1942 | Gits | 156/51 |
| 3,811,045 A | * | 5/1974 | Turner et al. | 264/250 |
| 3,919,386 A | * | 11/1975 | Segal | 264/167 |
| 3,985,948 A | * | 10/1976 | Olszewski et al. | 156/47 |
| 3,992,503 A | * | 11/1976 | Henfrey et al. | 264/255 |
| 4,045,604 A | * | 8/1977 | Clabburn | 264/230 |
| 4,373,113 A | * | 2/1983 | Winkler et al. | 174/179 |
| 4,396,797 A | * | 8/1983 | Sakuragi et al. | 138/110 |
| 4,806,398 A | * | 2/1989 | Martin, Jr. | 156/244.11 |
| 5,280,136 A | * | 1/1994 | Yaworski et al. | 174/73.1 |
| 6,229,092 B1 | * | 5/2001 | Pirovano | 138/123 |
| 2001/0015177 A1 | * | 8/2001 | Fujii | 119/57.92 |

FOREIGN PATENT DOCUMENTS

| | | | | |
|---|---|---|---|---|
| EP | 145055 A2 | * | 6/1985 | B29C/67/18 |
| EP | 767116 A2 | * | 4/1997 | B65G/19/14 |
| GB | 1389660 A | * | 4/1975 | B64F/1/02 |
| JP | 62103118 A | * | 5/1987 | 264/254 |
| JP | 08143125 A | * | 6/1996 | A01K/39/012 |
| JP | 2001258418 A | * | 9/2001 | A01K/5/00 |

* cited by examiner

Primary Examiner—Mark Eashoo
(74) Attorney, Agent, or Firm—Sughrue Mion, PLLC

(57) ABSTRACT

A disc cable capable of preventing occurrence of fine pieces of a metal wire material caused by wear and damage of a metal wire and preventing mixing of the fine pieces into feed is provided. A cover layer 5 formed of synthetic resin is formed on the surface of a metal wire 4, and a groove-like part 6 to which the surface of the metal wire 4 is exposed is formed not forming a part of the cover layer 5 in a predetermined spacing relation in a longitudinal direction of a cable 2. Then, a disc 3 formed of synthetic resin is molded, and the synthetic resin is flown into the groove-like part 6 to form a protrusion 8 on the disc 3 to fixedly mount it on the cable 2 to produce a disc cable 1 having the discs 3 disposed in a predetermined spacing relation on the cable 2.

7 Claims, 7 Drawing Sheets

(A)

(B)

(A)

(B)

DISC CABLE AND METHOD FOR PRODUCING THE SAME

BACKGROUND OF THE INVENTION

1. Field of the Invention

The present invention relates to a disc cable and a method for producing the same, the disc cable traveling within piping to carry feed for domestic animals to a large number of feeders.

2. Description of the Related Art

As a feed carrying apparatus for carrying feed for domestic animals to a number of feeders through piping from a feed hopper, a feed carrying apparatus 101 as shown in FIG. 7 has been heretofore known. In the feed carrying apparatus 101, a large number of feeders 107, 107, . . . are disposed on piping 104 connected endlessly through feed falling pipes 106, 106, . . . held in a predetermined spacing relation, and a driving device 102 to forcibly feed a disc cable 103 inserted into the piping 104 and connected endlessly in a direction of arrow x is disposed.

Further, a feed throw-in port 105a is formed at the lower end of a feed hopper 105 shown by the dotted lines in the figure, and feed fall-ports 106a are formed at the lower end of the feed falling pipes 106, whereby feed S is thrown into the piping 104 from the feed throw-in port 105a, carried within the piping 104 by the disc cable 103, and supplied from the feed fall-ports 106a into feeders 107.

In the disc cable 103, as shown in FIG. 8, discs 112 are fixedly mounted in a predetermined spacing relation on a wire 111, and the wire 111 is constituted such that as shown in FIG. 9, a bundled members 115 having a plurality of metal wires 114 bundled are twisted around a fiber element 113 arranged in the center.

However, the disc cable 103 is driven in a state loaded with high tension, comes in contact with mechanism parts such as a pulley, and is curved within the driving device 102 and at a corner part 104a of the piping 104. Therefore, the wire 111 becomes worn as the time passes, and the surface thereof becomes napped. After passage of a few years, the wire 114 is partly cut, whose fine pieces are mixed into the feed S and carried.

When domestic animals eat such fine pieces of the wire 114 together with the feed S, the wire 114 which is made of metal as described above sometimes sticks into the internal organs such as the stomach and the intestines of domestic animals, and the domestic animals becomes sick or the growth thereof is impeded. Further, when a human being eats such the internal organs of domestic animals, there poses a problem that the human body is seriously affected thereby.

SUMMARY OF THE INVENTION

The present invention has been accomplished in order to solve the problem as noted in the conventional disc cable. It is an object of the present invention to provide a disc cable capable of preventing occurrence of fine pieces of a wire caused by wear and damage of the wire over a long period to be mixed into feed.

For solving the aforementioned problem, the present invention provides a disc cable which travels within piping connected endlessly, the cable having discs disposed thereon in a predetermined spacing relation, wherein a cover layer formed of synthetic resin is formed on the surface of a metal wire to constitute a cable.

Preferably, the synthetic resin for forming the cover layer is synthetic resin having flexibility.

Alternatively, in the disc cable, the cover layer is not partly formed in the cable, but a groove-like part to which is exposed the surface of the metal wire is formed, and a protrusion corresponding to the groove-like part is formed on the disc.

Alternatively, in the disc cable, the cover layer is formed on the surface of the metal wire in predetermined length, and the disc is formed integral with the cover layer.

Preferably, the disc is formed with a fitting hole reaching the substantially central part so that one end of the cover layer is fitted in the fitting hole.

Further, in the disc cable, an inner layer part of a boss part is formed integral with a flange part of the disc, one end of the cover layer is covered over the inner layer part of the boss part to form an outer layer of the boss part.

Preferably, a depression is formed in the inner layer part of the boss part, and a protrusion corresponding to the depression is formed on one end of the cover layer.

The producing method for a disc cable according to the present invention is able to produce a disc cable of the present invention suitably, and comprises a step of forming a cover layer formed of synthetic resin on the surface of a metal wire, and a step of molding a disc and fixedly mounting it on the cable.

Preferably, in forming the cover layer, a groove-like part which the surface of the metal wire is exposed in which the cover layer is not partly formed in a predetermined spacing relation in a longitudinal direction of the cable, and in molding the disc, synthetic resin is flown into the groove-like part to form a protrusion on the disc.

Further, the producing method for a disc cable according to the present invention comprises a step of forming a cover layer formed of synthetic resin on the surface of a metal wire in a predetermined length, and molding a disc formed of synthetic resin integral with the cover layer.

Preferably, in molding the disc, a fitting hole is formed in the disc, and one end of the cover layer is fitted in the fitting hole.

Further, the producing method for a disc cable according to the present invention comprises a step of molding a disc formed of synthetic resin on the surface of a metal wire to fixedly mount the wire, and a step of forming a cover layer formed of synthetic resin on the surface of the metal wire and covering one end thereof on a boss part of the disc.

Preferably, in molding an inner layer part of the boss part and a flange part of the disc integrally, a depression is formed in the inner layer part of the boss part of the disc, and in forming the cover layer and covering one end thereof on the inner layer part of the boss part of the disc to form an outer layer of the boss part, a protrusion corresponding to the depression is formed on one part of the cover layer.

DESCRIPTION OF THE PREFERRED EMBODIMENTS

The preferred embodiments of the disc cable according to the present invention will be concretely described hereinafter with reference to the accompanying drawings.

Figure 1:
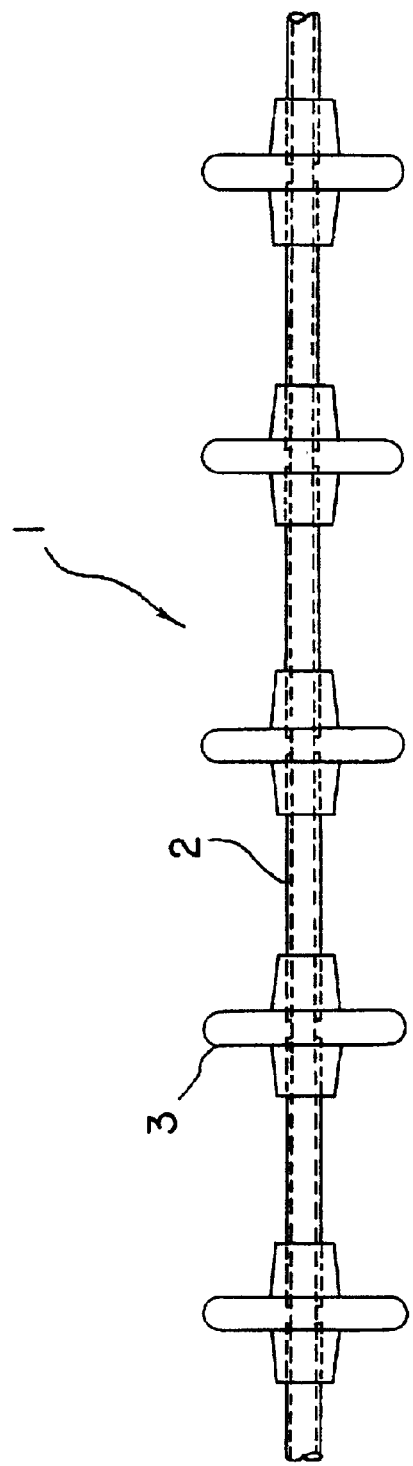
FIG. 1 is a front view of a disc cable according to the present invention.
Figure 2:
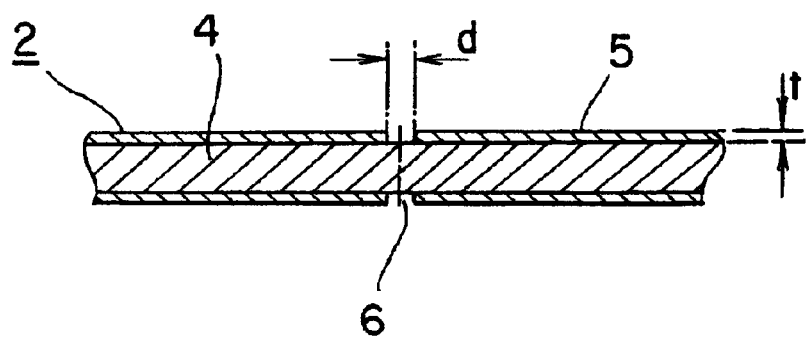
FIG. 2 is an explanatory view showing one embodiment of a method for producing a disc cable according to the present invention.
Figure 2:
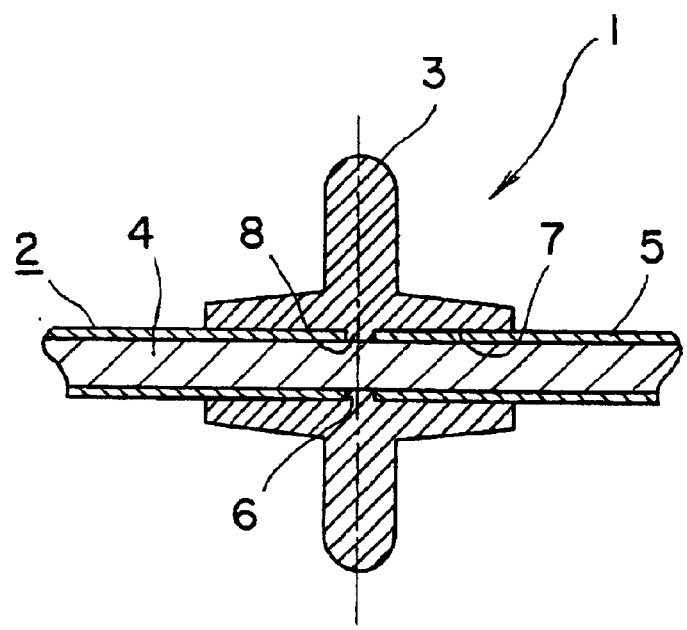
Figure 3:
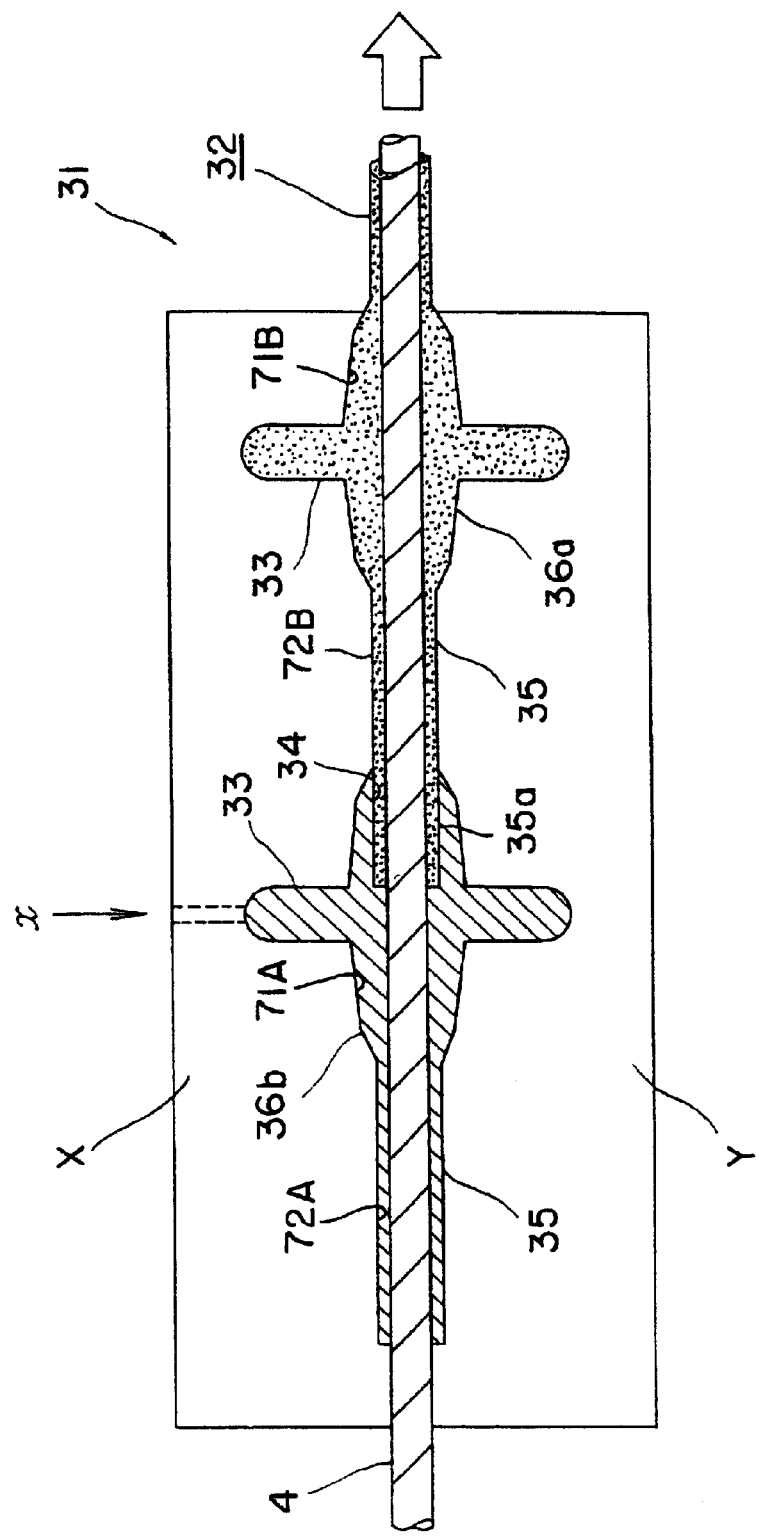
FIG. 3 is an explanatory view showing a further embodiment of a method for producing a disc cable according to the present invention.
Figure 4:
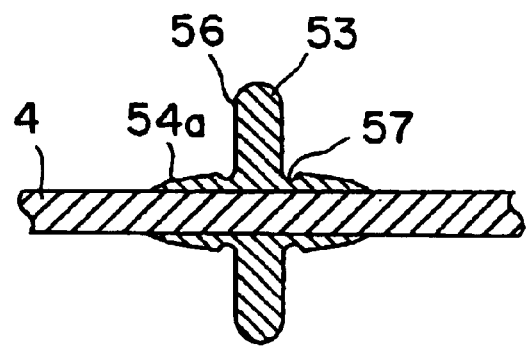
FIG. 4 is an explanatory view showing another embodiment of a method for producing a disc cable according to the present invention.
Figure 4:
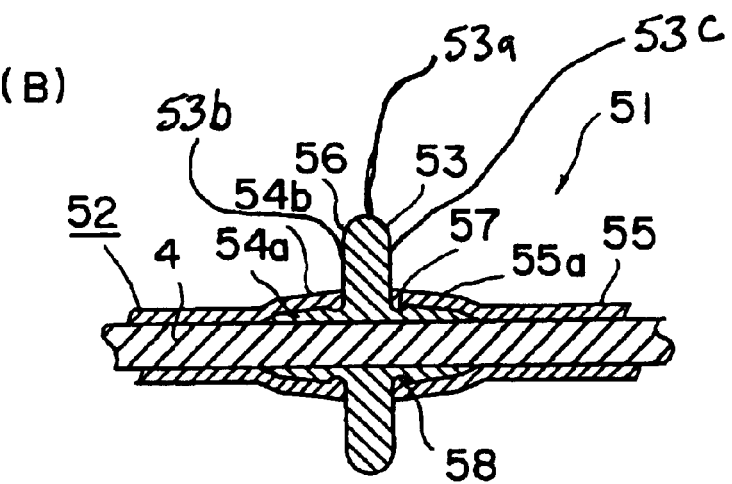
Figure 5:
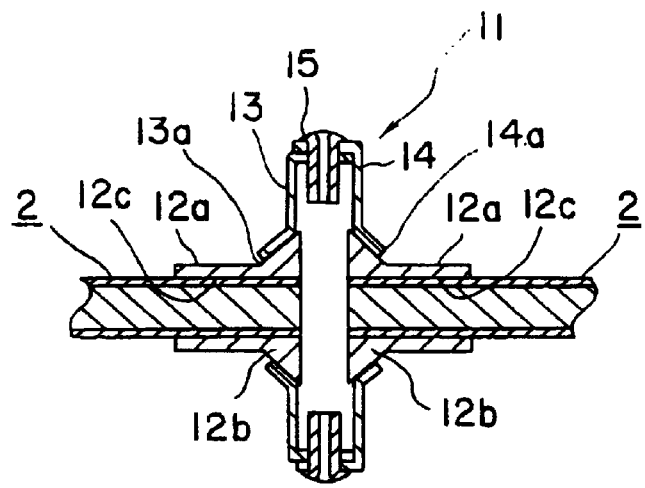
FIG. 5 is a sectional view showing a connecting member for connecting ends of a disc cable together.
Figure 6:
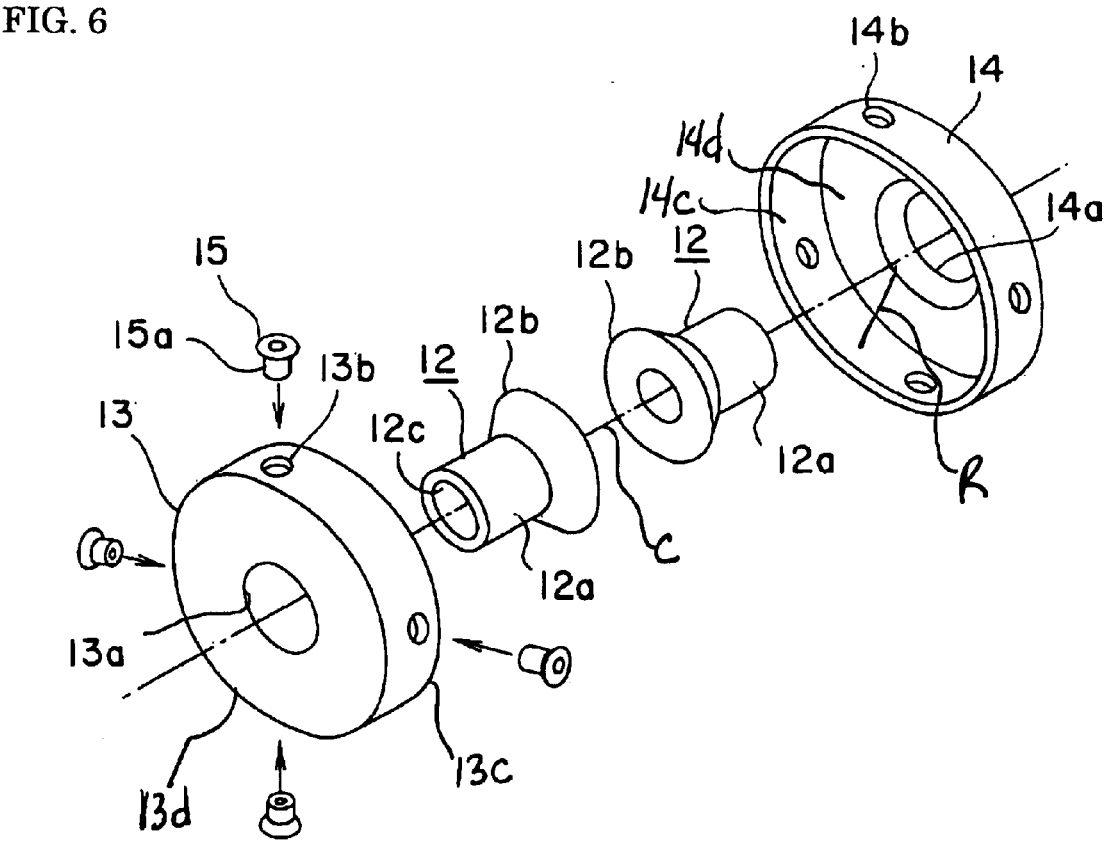
FIG. 6 is an exploded perspective view of the connecting member shown in FIG. 5.
Figure 7:
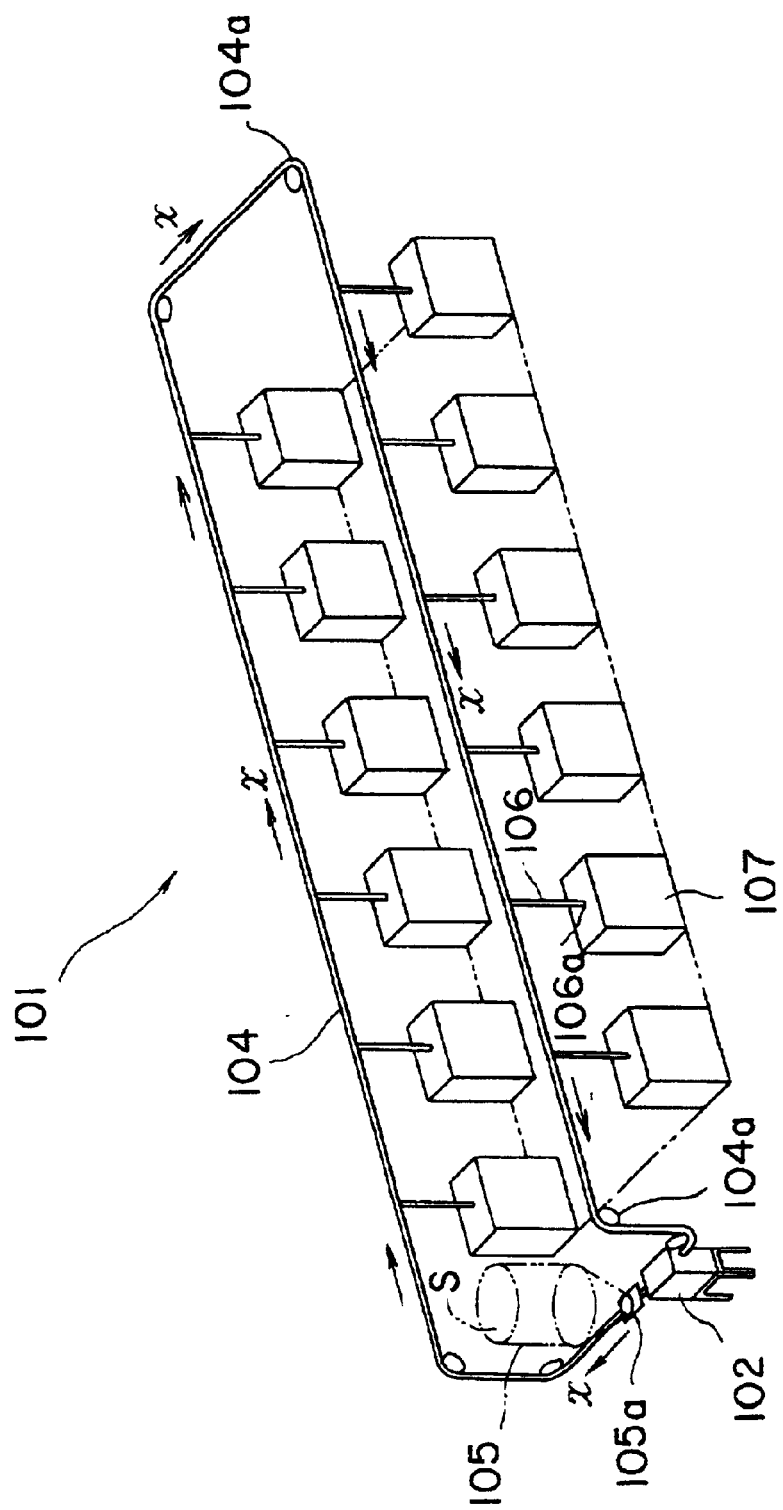
FIG. 7 is a perspective view of whole feed carrying apparatus.
Figure 8:
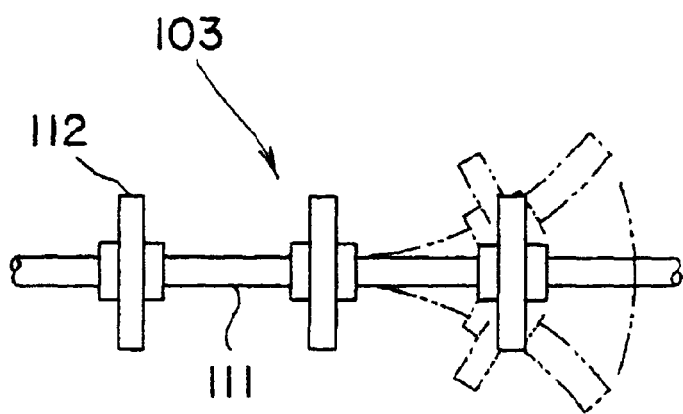
FIG. 8 is a front view of the conventional disc cable.
Figure 9:
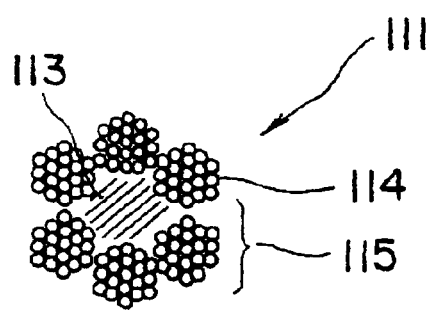
FIG. 9 is a sectional view of a wire of the conventional disc cable.

FIG. 1 is a front view of a disc cable according to the present invention, FIG. 2 is an explanatory view showing one embodiment of a method for producing a disc cable according to the present invention, FIG. 3 is an explanatory view showing a further embodiment of a method for producing a disc cable according to the present invention, FIG. 4 is an explanatory view showing another embodiment of a method for producing a disc cable according to the present invention, FIG. 5 is a sectional view showing a connecting member for connecting ends of a disc cable together, and FIG. 6 is an exploded perspective view of the connecting member shown in FIG. 5.

In the disk cable 1 according to the present invention, discs 3 are disposed in a predetermined spacing relation on a cable 2 having a predetermined length, as shown in FIG. 1.

In the disc cable 1 according to one embodiment of the present invention, in the cable 2, a cover layer 5 is formed on the surface of a wire 4 constituted by twisting the conventional bundled member 115 having metal wires 114 bundled, as shown in FIG. 2.

The cover layer 5 is formed of synthetic resin, but preferably, synthetic resin having flexibility, particularly, polypropylene, nylon or the like are applied so that the cable 2 is able to maintain sufficient flexibility.

The thickness t of the cover layer 5 is not particularly limited, but preferably, 0.5 to 3.0 mm, more preferably, 0.75 to 2.0 mm.

In a position where the disc 3 of the cable 2 is disposed, the cover layer 5 is not partly formed, but a groove-like part 6 which is exposed the surface of the wire is formed.

The length d of the groove-like part 6 is not particularly limited, but preferably, 1.0 to 5.0 mm, more preferably, 1.5 to 4.5 mm.

In the disc cable 1, the disc 3 is obtained by molding synthetic resin into a predetermined shape.

Also, with respect to the synthetic resin of which the disc 3 is formed, preferably, synthetic resin having flexibility, particularly, polypropylene, and nylon are applied. However, since the outer peripheral surface of the disk 3 tends to come in contact with the inner wall surface of piping 104 to become worn, preferably, synthetic resin excellent in hardwearing properties, particularly, polyacetal or the like is applied.

A protrusion 8 corresponding to the groove-like part is formed in the substantially central part of a through-hole 7 of the disc 3.

In a disc cable 31 according to another embodiment, a cover layer 35 of a cable 32 and a disc 33 are formed integrally in a predetermined length, as shown in FIG. 3.

One end 35a of a cover layer 35 is fitted in a fitting hole 34 reaching the substantially central part of the disc 33.

Material and thickness of the cover layer 35 of the cable 32 and material of the disc 33 are similar to those of the disc cable 1.

In a disc cable 51 according to still another embodiment, one end 55a of a cover layer 55 of a cable 52 is covered over an inner layer part 54a of a boss art 54 of a disc 3 to form an outer layer part 54b of the boss part 54, as shown in FIG. 4.

A depression 57 is formed in a boundary part between an inner layer part 54a of the boss part 54 and a flange part 56, and a protrusion 58 corresponding to the depression 57 is formed on one end 55a of the cover layer 55.

Material and thickness of the cover layer 55 of the cable 52 and material of the inner layer pat 54a of the boss part 54 of the disc 53 are similar to those of the disk cable 1.

Next, the method for producing a disc cable according to the present invention will be concretely described with reference to the drawings.

The method for producing a disc cable according to the present invention comprises a first step of forming a cover layer 5 on the surface of a wire 4, and a second step of molding a disc 3 to secure it to a cable 2.

In the first step, the cover layer 5 formed of synthetic resin is formed on the surface of the wire 4, as shown in FIG. 2(A).

The forming method for the cover layer 5 is not particularly limited, but for example, a wire 4 is positioned in a predetermined spacing relation with respect to the inner wall surface of a mold to fill the mold with synthetic resin to form the cover layer 5.

Also, the thickness t of the cover layer 5 is not particularly limited, but preferably, 0.5 to 3.0 mm, particularly, 0.75 to 2.0 mm, as described previously. For example, in a case where the diameter of the wire is 4 mm, the thickness t of the cover layer 5 is preferably, approximately 1.0 mm.

Further, in a position where the disc 3 is disposed, the cover layer 5 is not partly formed, but a groove-like part 6 to which the surface of the wire 4 is exposed is provided. Thereby, the groove-like parts 6 are formed in a predetermined spacing relation with respect to the longitudinal direction of the cable 2.

Also, the length d of the groove-like part 6 is not particularly limited, but preferably, 1.0 to 5.0 mm, particularly, 1.5 to 4.5 mm, as described previously. For example, in a case where the diameter of the wire 4 is 4 mm, preferably, the length d of the groove-like part is approximately 4.0 mm.

In the second step, the disc 3 is molded and secured to the cable 2, as shown in FIG. 2(B).

Also, the molding method for the disc 3 is not particularly limited, but for example, the cable 2 is positioned with a mold having a predetermined wall surface shape to fill the mold with synthetic resin to mold the disc 3.

In molding the disc 3, since groove-like part 6 is being formed in a position where the disc 3 of the cable 2 is disposed, synthetic resin flows into the groove-like part 6 also, and a protrusion 8 corresponding to the groove-like part 6 is formed in the substantially central part of a through-hole 7 of the disc 3.

Since, generally, the synthetic resin having flexibility such as polypropylene, nylon or the like is poor in adhesive properties, if the cover layer 5 is formed over the whole surface of the wire 4, the disk 3 cannot be firmly secured to the cable 2 when the disk 3 is formed.

However, if the groove-like part 6 is formed in advance in the cable 2, the synthetic resin flows into the groove-like part 6 to form the protrusion 8 on the disc 3, and the groove-like part 6 and the protrusion 8 assume a fitted state, whereby the disc 3 can be firmly fixedly mounted on the cable 2.

Further, there is an advantage in that the groove-like part 6 is formed in a predetermined spacing relation with respect to the cable 2, whereby the disc 3 can be disposed in a predetermined relation accurately.

Furthermore, there is a further advantage in that since the disc 3 is not fixedly mounted on the cable 2 by contact bonding or the like, excessive load is not applied to the cable 2 in a position where the disc 3 is disposed.

The producing method for a disc cable 31 according to the present invention comprises one molding step of integrally forming a cover layer 35 and a disc 33 on the surface of a wire 4 in a predetermined length.

In carrying out the producing method for the disk cable 31, for example, as shown in FIG. 3, use is made of a forming die comprising a upper die X and a lower die Y in which disc forming cavities 71A and 71B are defined in a predetermined spacing relation when a mold is closed, and cover layer forming cavities 72A and 72B are defined on both sides of the disk forming cavity 71A.

The wire 4 is positioned between the upper die X and the lower die Y, the mold is closed, and the synthetic resin is injected into the disc forming cavity 71A and the cover layer forming cavity 72A in a direction of x.

Thereby, the cover layer 35 of the cable 32 and the disc 33 are molded integrally in a predetermined length to form a constituent unit 36a fixedly mounted on the wire 4.

Subsequently, the mold is opened after molding to remove the constituent unit 36a integrally molded within the disc forming cavity 71A and the cover layer forming cavity 72A to move it into the disc forming cavity 71B and the cover layer forming cavity 72B on the right side.

Then, the mold is closed again, and the synthetic resin is injected into the disc forming cavity 71A and the cover layer forming cavity 72A in a direction of x.

Thereby, a constituent unit 36b having the cover layer 35 and the disc 33 of the cable 32 molded integrally in a predetermined length is formed, and one end 35a of the cover layer 35 of the constituent unit 36a is fitted in the fitting hole 34 of the disc 33 of the constituent unit 36b, whereby the constituent units 36a and 36b are connected together.

By repeating the above-described procedure, the disc cable 31 having the constituent units 36 connected in a chain-like form is produced.

Since this is a mere procedure of molding the cover layer 35 and the disc 33 of the cable 32 integrally, and moving the integrally molded constituent unit 36 into the disc forming cavity 71B and the cover layer forming cavity 72B, it takes no time for locating the wire 4, and the disc cable 31 can be produced simply and quickly.

Further, since the cover layer 35 and the disc 33 of the cable 32 are molded integrally, and the fitting hole 34 of the disc 33 of the constituent unit 36b and the one end 35a of the cover layer 35 of the constituent unit 36a assume a fitted state, the discs 33 are disposed in a predetermined relation accurately, and the positions of them are not moved along the cable 32.

The producing method for a disc cable 51 according to the present invention comprises a first step of molding a disc 53 on the surface of a wire 4 to fixedly mount it on the cable 2, and a second step of forming a cover layer 55 and covering one end 55a thereof over a boss part 54 of the disc 53.

In the first step, the disk 53 formed of synthetic resin is molded and fixedly mounted on the surface of the wire 4, as shown in FIG. 4(A).

At that time, an inner layer part 54a of the boss part 54 of the disc 53 and a flange part 56 are molded integrally, and a depression 57 is formed in a boundary part between the inner layer part 54a of the boss part 54 of the disc 53 and the flange part 56.

The molding method for the disc 53 is not particularly limited, but for example, a wire 4 is positioned within a mold having a predetermined inner wall surface shape, and the mold is filled with synthetic resin to mold the disc 53.

In the second step, a cover layer 55 formed of synthetic resin is formed on the surface of the wire 4, and one end 55a thereof is covered over a boss part 54 of the disc 53.

At that time, the one end 55a of the cover layer 55 is covered over the inner layer part 54a of the boss part 54 to form an outer layer part 54b of the boss part 54, and a protrusion 58 corresponding to the depression 57 is formed on the one end 55a of the cover layer 55.

Also, the forming method for the cover layer 5 is not particularly limited, but for example, the wire 4 is positioned maintaining a predetermined spacing with respect to the inner wall surface of the mold, and the mold is filled with synthetic resin to form the cover layer 55.

The one end 55a of the cover layer 55 is covered over the inner layer part 54a of the boss part 54 to form the outer layer part 54b of the boss part 54, and the depression 57 formed in the boundary part between the inner layer part 54a of the boss part 54 and the flange part 56 and the protrusion 58 formed on the one end 55a of the cover layer 55 assume a fitted state, and therefore, the discs 53 are disposed in a predetermined spacing relation accurately, and the positions of them are not moved along the cable 52.

The disc cables 1, 31, and 51 are produced in the procedure as described above, but since the disc cable used for the feed carrying apparatus 101 is considerably long, actually, a plurality of disc cables 1, 31, and 51 are connected for use.

As the connecting member 11 for connecting the disc cables 1, 31, and 51, for example, one shown in FIGS. 5 and 6 can be applied.

According to the connecting member 11, an end of the cable 2 is inserted into a through-hole 12c of a contact bonding terminal 12, and a cylindrical part 12a is crushed to thereby contact-bond the end of the cable 2. Then, a curved part 12b of the contact bonding terminal 12 is engaged internally with engaging holes 13a and 14a of connecting cases 13 and 14, and the connecting cases 13 and 14 are fitted, and a rivet 15 is inserted into joining holes 13b and 14b whereby the disc cable 1 can be connected.

As is clear in the Figures, each of the cases 13 and 14 have a hollow cylindrical interior 13c, 14c that extend radially outward from a central axis C by an amount R, and end portions 13d, 14d. When radial part 53a of disc 53 is formed within the mold, it has a size in a radial direction defined by the dimension R and has opposed radial surfaces 53b, 53c that are defined by the end portions 13d, 14d of the molds 13, 14, respectively.

This rivet 15 is a special rivet called a blind rivet, which can be used such that the rivet is inserted into joining holes 13b and 14b, after which the cylindrical part 15a is spread open whereby the connecting cases 13 and 14 can be firmly joined.

In the disc cable according to the present invention, since the cover layer formed of synthetic resin is formed on the surface of the metal wire, it is possible to prevent the metal wire from being worn and fluffing in surface thereof over a long period, and prevent a part of wire from being cut and the fine pieces from mixing into feed S.

Thereby, it is possible to prevent domestic animals from becoming sick or impeding the growth thereof as the result that domestic animals eat fine pieces of the wire together with the feed S over a long period, and the wire sticks into the internal organs, and to prevent the human body from being seriously affected thereby.

What is claimed is:

1. A method for continuously producing a disc cable which travels within piping connected endlessly, the cable having a metal wire and discs disposed thereon in a predetermined spacing relation, the method comprising:

a step of forming a cover layer formed of synthetic resin on the surface of the metal wire, and forming a groove-like part through which the surface of the metal wire is exposed, said groove-like part not forming a part of the cover layer and being distributed in a predetermined spacing relation in a longitudinal direction of the cable, and a step of molding a disc formed of synthetic resin, and causing synthetic resin to flow into the groove-like part to form a protrusion in the substantially central cart of the disc to fixedly mount it on the cable.

2. The method for continuously producing a disc cable as recited in claim 1 wherein said groove like part has a length of 1.0 mm to 5.0 mm.

3. The method for continuously producing a disc cable as recited in claim 1 wherein said groove like part has a length of 1.5 mm to 4.5 mm.

4. The method for continuously producing a disc cable as recited in claim 1 wherein said groove like part has a length approximately equal to a diameter of said wire.

5. The method for continuously producing a disc cable as recited in claim 1 wherein said groove-like part has a length substantially smaller than a length of said disc, including said radial part and said boss parts.

6. A producing method for a disc cable which travels within piping connected endlessly, the cable having a metal wire and discs disposed thereon in a predetermined spacing relation, the method comprising a step of forming a cover layer formed of synthetic resin on the surface of the metal wire, and forming a disc formed of synthetic resin integral with the cover layer, wherein in molding the disc, a fitting hole is formed in the disc, and one end of the cover layer is fitted in the fitting hole.

7. A method for continuously producing a disc cable which travels within piping connected endlessly, the cable having a metal wire and discs disposed thereon in a predetermined spacing relation, each of said discs comprising a radial part having opposed radial surfaces and a boss part extending from a respective one of said radial surfaces and having an inner layer part and an outer layer part, the method comprising:

a step of molding the inner layer part of the boss part of the disc and the radial part of the disc integrally, and forming a depression in the inner layer part of the boss part of the disc proximate the radial surface of said radial part of the disc, and a step of forming the cover layer formed of synthetic resin on the surface of the metal wire, covering one end thereof on the inner layer part of the boss part of the disc to form the outer layer part of the boss part of the disc extending to said radial surface, and forming a protrusion corresponding to the depression on one end of the cover layer.

* * * * *